(12) United States Patent
Inoue

(10) Patent No.: US 10,831,871 B2
(45) Date of Patent: Nov. 10, 2020

(54) ROBOT SYSTEM HAVING BIOMETRIC AUTHENTICATION FUNCTION

(71) Applicant: FANUC CORPORATION, Yamanashi (JP)

(72) Inventor: Naoto Inoue, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 302 days.

(21) Appl. No.: 15/934,225

(22) Filed: Mar. 23, 2018

(65) Prior Publication Data

US 2018/0285543 A1   Oct. 4, 2018

(30) Foreign Application Priority Data

Apr. 4, 2017   (JP) .................................. 2017-074644

(51) Int. Cl.
*G06F 21/32* (2013.01)
*G06K 19/077* (2006.01)
(Continued)

(52) U.S. Cl.
CPC .......... *G06F 21/32* (2013.01); *G06K 9/00664* (2013.01); *G06K 9/00885* (2013.01);
(Continued)

(58) Field of Classification Search
CPC ................ G06F 21/32; G06K 9/00885; G06K 9/00664; G06K 19/07773; G06K 19/0718;
(Continued)

(56) References Cited

U.S. PATENT DOCUMENTS

2004/0236701 A1* 11/2004 Beenau ................... G06Q 20/40
705/64
2015/0127124 A1* 5/2015 Kobayashi ............. B25J 9/1689
700/83
(Continued)

FOREIGN PATENT DOCUMENTS

CN    102376001 A    3/2012
CN    104950702 A    9/2015
(Continued)

OTHER PUBLICATIONS

English Machine Translation of Decision to Grant a Patent mailed by Japan Patent Office (JPO) for Application No. JP2017-074644, dated Jan. 7, 2020, 2 pages.
(Continued)

*Primary Examiner* — Ashokkumar B Patel
*Assistant Examiner* — Quazi Farooqui
(74) *Attorney, Agent, or Firm* — Fredrikson & Byron, P.A.

(57) ABSTRACT

A robot system includes a robot, and an RF tag, the RF tag including a detection device for detecting biometric authentication information of an individual, a memory for storing unique biometric authentication information of an authorized person which is authorized to perform operations related to a task of the robot, a first processor for obtaining a biometric authentication result by comparing the biometric authentication information detected by the detection device with the unique biometric authentication information stored in the memory, and a first antenna for transmitting the biometric authentication result obtained by the first processor. The robot system further includes a control device including a second antenna for receiving the biometric authentication result transmitted from the RF tag, wherein the control device advances a process of the operation when
(Continued)

the biometric authentication result indicates that the individual is the authorized person.

7 Claims, 8 Drawing Sheets

(51) Int. Cl.
*G06K 9/00* (2006.01)
*G06K 19/073* (2006.01)
*G06K 19/07* (2006.01)

(52) U.S. Cl.
CPC ... *G06K 19/07773* (2013.01); *G06K 9/00006* (2013.01); *G06K 9/00087* (2013.01); *G06K 19/0718* (2013.01); *G06K 19/07354* (2013.01)

(58) Field of Classification Search
CPC ......... G06K 9/00006; G06K 19/07354; G06K 9/00087; G06K 9/00906; G06K 9/00107; B25J 9/1658
See application file for complete search history.

(56) References Cited

U.S. PATENT DOCUMENTS

| | | | | |
|---|---|---|---|---|
| 2015/0273704 | A1* | 10/2015 | Inaba | B25J 9/161 700/264 |
| 2015/0288688 | A1* | 10/2015 | Derakhshani | H04M 1/673 726/19 |

FOREIGN PATENT DOCUMENTS

| | | | |
|---|---|---|---|
| CN | 105983969 | A | 10/2016 |
| JP | 2004348478 | A | 12/2004 |
| JP | 2008221363 | A | 9/2008 |
| JP | 20099397 | A | 1/2009 |
| JP | 2010198465 | A | 9/2010 |
| JP | 2015188990 | A | 11/2015 |
| WO | 2017025479 | A1 | 2/2017 |

OTHER PUBLICATIONS

Untranslated Decision to Grant a Patent mailed by Japan Patent Office (JPO) for Application No. JP2017-074644, dated Jan. 7, 2020, 3 pages.
English Machine Translation of Notification of Reasons for Refusal mailed by Japan Patent Office (JPO) for Application No. JP2017-074644, dated Aug. 27, 2019, 2 pages.
Untranslated Notification of Reasons for Refusal mailed by Japan Patent Office (JPO) for Application No. JP2017-074644, dated Aug. 27, 2019, 2 pages.
English Machine Translation of Notification of Reasons for Refusal mailed by Japan Patent Office (JPO) for Application No. JP2017-074644, dated May 7, 2019, 3 pages.
Untranslated Notification of Reasons for Refusal mailed by Japan Patent Office (JPO) for Application No. JP2017-074644, dated May 7, 2019, 4 pages.
English Machine Translation of Notification of Reasons for Refusal mailed by Japan Patent Office (JPO) for Application No. JP2017-074644, dated Dec. 4, 2018, 3 pages.
Untranslated Notification of Reasons for Refusal mailed by Japan Patent Office (JPO) for Application No. JP2017-074644, dated Dec. 4, 2018, 4 pages.
English Abstract and Machine Translation for Japanese Publication No. 2010-198465 A, published Sep. 9, 2010, 13 pgs.
English Abstract and Machine Translation for Japanese Publication No. 2009-009397 A, published Jan. 15, 2009, 7 pgs.
English Abstract and Machine Translation for Japanese Publication No. 2015-188990 A, published Nov. 2, 2015, 14 pgs.
English Abstract and Machine Translation for Japanese Publication No. 2008-221363 A, published Dec. 25, 2008, 9 pgs.
English Abstract and Machine Translation for Japanese Publication No. 2004-348478 A, published Dec. 9, 2004, 17 pgs.
English Abstract and Machine Translation for Chinese Publication No. CN 102376001 A, published Mar. 14, 2012, 11 pgs.
English Abstract and Machine Translation for Chinese Publication No. CN 104950702 A, published Sep. 30, 2015, 10 pgs.
English Abstract and Machine Translation for Chinese Publication No. CN 105983969 A, published Oct. 5, 2016, 9 pgs.

* cited by examiner

ROBOT SYSTEM HAVING BIOMETRIC AUTHENTICATION FUNCTION

BACKGROUND OF THE INVENTION

1. Field of the Invention

The present invention relates to a robot system having a biometric authentication function.

2. Description of Related Art

In robot systems including robots and control devices therefor, an operator operates a control device or the like. For security purposes, in some cases it is preferable to allow operations to be performed only by authorized personnel that satisfy predetermined conditions. Thus, in robot systems and in other industrial fields as well, various techniques for allowing operations to be performed only by authorized personnel have been proposed (for example, Japanese Unexamined Patent Publication (Kokai) No. 2010-198465 and Japanese Unexamined Patent Publication (Kokai) No. 2009-9397).

SUMMARY OF THE INVENTION

In robot systems, a technology which can further improve security is desired.

The first aspect of the present disclosure provides a robot system including a robot, and an RF tag, the RF tag comprising a detection device for detecting biometric authentication information of an individual, a memory for storing unique biometric authentication information of authorized personnel which are authorized to perform operations related to a task of the robot, a first processor for obtaining a biometric authentication result by comparing the biometric authentication information detected by the detection device with the unique biometric authentication information stored in the memory, and a first antenna for transmitting the biometric authentication result obtained by the first processor, the robot system further including a control device comprising a second antenna for receiving the biometric authentication result transmitted from the RF tag, wherein the control device advances a process of the operation when the biometric authentication result indicates that the individual is authorized personnel.

According to the first aspect of the present disclosure, the RF tag determines whether or not the individual holding the RF tag is authorized personnel using the biometric authentication information. When the biometric authentication result indicates that the individual is authorized personnel, the operation related to the task of the robot is advanced. Thus, even if an unauthorized person holds the RF tag, it is possible to prevent the process of the operation related to the task of the robot from advancing. Therefore, security can be improved.

DETAILED DESCRIPTION

Robot systems according to the embodiments will be described below with reference to the attached drawings. The same or corresponding elements are assigned the same numerals, and redundant explanations therefor have been omitted.

Figure 1:
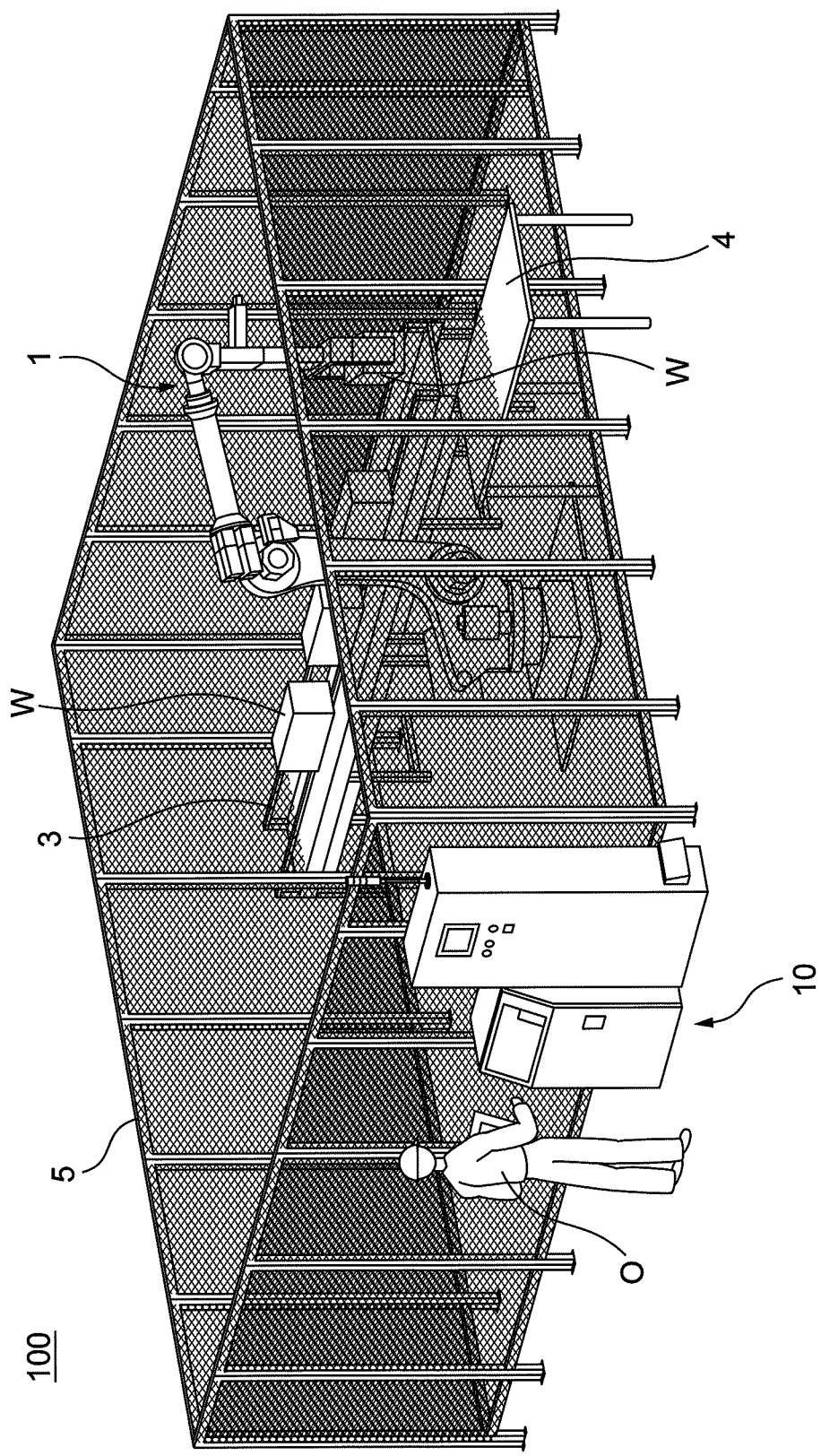
FIG. 1 is a perspective view of a robot system according to a first embodiment.
Figure 2:
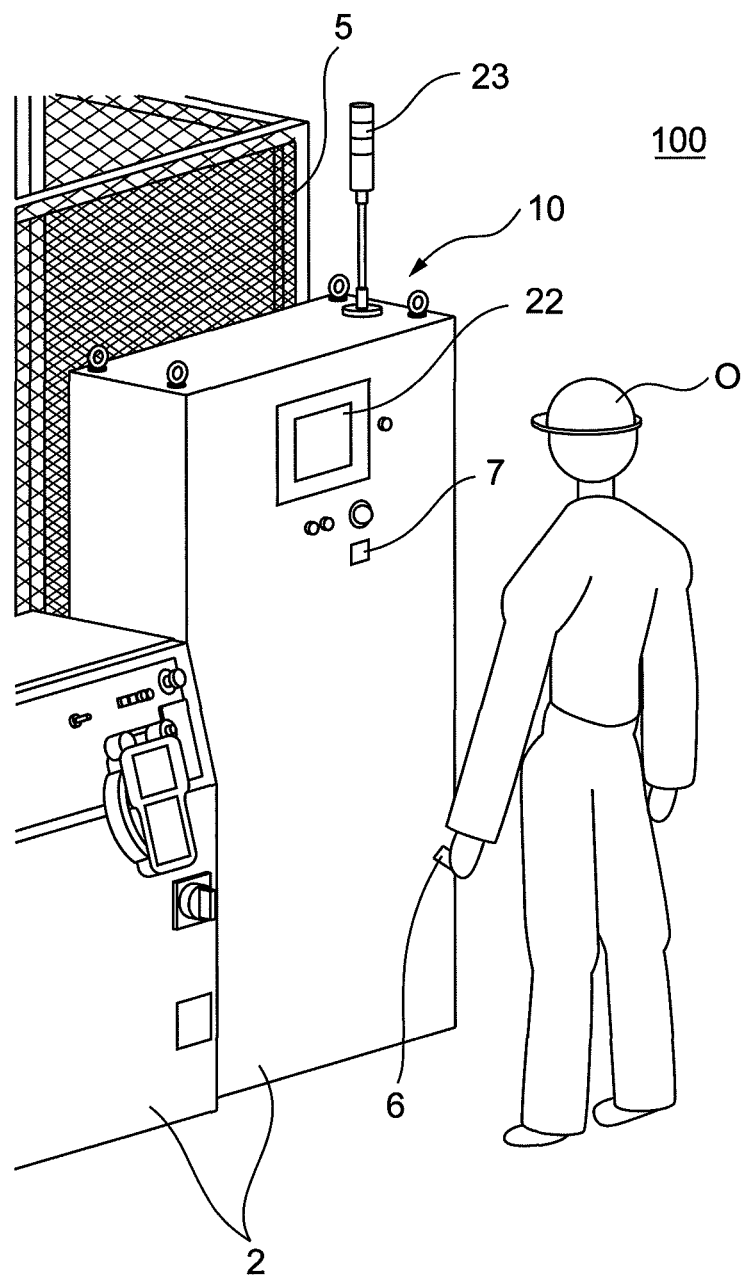
FIG. 2 is an enlarged partial view of FIG. 1.
Figure 3:
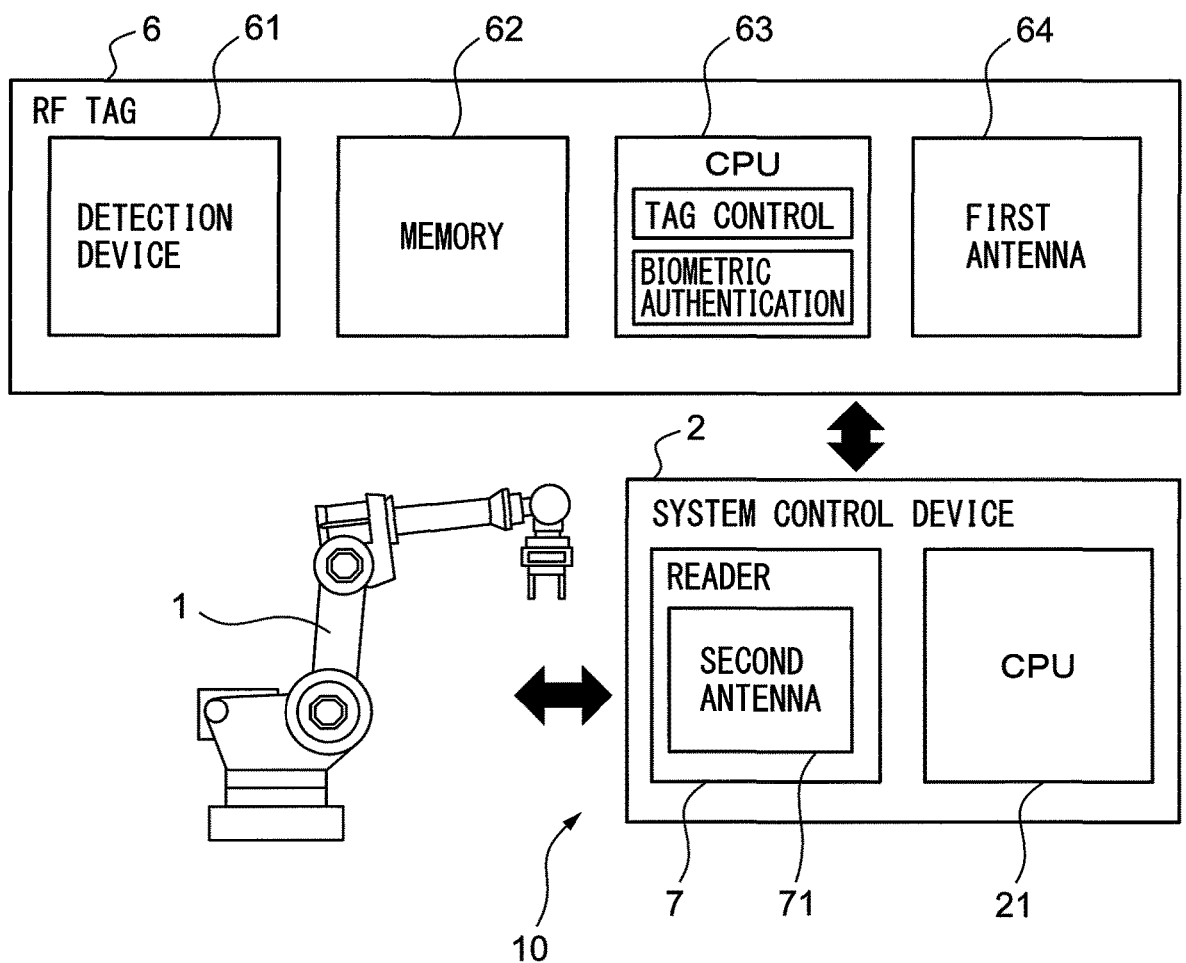
FIG. 3 is a block diagram of the robot system of FIG. 1.

FIG. 1 is a perspective view of a robot system according to a first embodiment, FIG. 2 is an enlarge partial view of FIG. 1, and FIG. 3 is a block diagram of the robot system of FIG. 1. As shown in FIG. 1, the robot system 100 includes, for example, a robot 1, a control device 10, a conveyor 3, a table 4, and a safety fence 5. The robot 1 is, for example, a six-axis articulated robot. The robot 1 may be another type of robot. The robot 1 is configured to, for example, convey items W between the conveyor 3 and the table 4 within the safety fence 5. The robot 1 may perform other operations.

As shown in FIG. 3, the control device 10 has a system controller 2. The system controller 2 is configured to control a task execution machine including the robot 1, and is configured to control, in addition to the robot 1, at least one of, for example, the conveyor 3, the table 4, and the safety fence 5. The system controller 2 includes, for example, a CPU (central processing unit) (second processor) 21, ROM (read-only memory) (not shown) and RAM (random access memory) (not shown). The CPU 2 is configured to control each constituent element of the system controller 2 and each constituent element of the robot 1. The CPU 21 may be configured to also control other constituent elements of the robot system 100. The CPU 21 is configured to be communicable with a reader 7, which is described later. As shown in FIG. 2, the system controller 2 includes a touch panel 22 that accepts input from and displays information to an operator O. The system controller 2 may additionally or alternatively include other input devices or display devices. Furthermore, the system controller 2 may include other peripheral devices, such as a signal lamp 23. The system controller 2 is capable of wired or wireless communication with the robot 1, and is configured to transmit a signal to the robot 1.

The robot system 100 further includes an RF tag 6 and a reader 7. The RF tag 6 and the reader 7 constitute an RFID (radio frequency identification) system. The RF TAG 6 is intended to be held by an authorized person who is authorized to perform one or more operations associated with the task of the robot 1. In the present embodiment, the reader 7 is incorporated in the system controller 2. Alternatively, the reader 7 may be attached to another location, such as the safety fence 5 in the vicinity of the system controller 2 so as to be capable of, for example, wireless communication or wired communication with the system controller 2.

As shown in FIG. 3, the RF tag 6 includes a detection device 61, a memory 62, a CPU (first processor) 63, and a first antenna 64.

The detection device 61 is configured to detect the biometric authentication information of an individual. The biometric authentication may be, for example, fingerprint authentication or vein authentication, and the detection device 61 may be configured to detect fingerprint data or vein data as the biometric authentication information. The detection device 61 may be configured to detect data other than fingerprint data and vein data in order to perform biometric authentication other than fingerprint authentication or vein authentication. The detection device 61 may be, for example, a capacitive sensor or an optical sensor.

The memory 62 is configured to store information on authorized personnel who are authorized to perform operations related to the task of the robot 1. The information on authorized personal includes unique biometric authentication information of authorized personnel such as the fingerprint data or vein data of authorized personnel. Furthermore, the information on authorized personnel may include various types of information such as the name and identification number of the authorized personnel, and one or more operations related to the task of robot 1 that the authorized personnel is authorized to perform. The memory 62 may store other information. The memory 62 may be, for example, a nonvolatile memory such as a flash memory or other kinds of memories.

The CPU 63 is configured to obtain a biometric authentication result by comparing the biometric authentication information detected by the detection device 61 with the unique biometric authentication information stored in the memory 62. As a result, the CPU 63 can determine whether or not the operator O holding the RF tag 6 is authorized personnel. Furthermore, the CPU 63 may be configured to control each component of the RF tag 6.

The first antenna 64 is configured to transmit the biometric authentication result obtained by the CPU 63 to an external device. The first antenna 64 can exchange data with the second antenna 71 of the reader 7, which will be described later. The first antenna 64 may use any communication method for RFID. For example, the first antenna 64 may use an electromagnetic induction method or a radio wave method.

The reader 7 includes a second antenna 71. The second antenna 71 is configured to receive the biometric authentication result transmitted from the RF tag 6. Data other than the biometric authentication result may be exchanged between the first antenna 64 and the second antenna 71. The reader 7 may be able to write data to the RF tag 6 (the reader 7 may also be referred to as a reader/writer). The second antenna 71 may have the same configuration as that of the first antenna 64.

The reader 7 transmits the biometric authentication result to the CPU 21. The CPU 21 is configured to advance the process of the one or more operations related to the task of the robot 1 when the biometric authentication result indicates that the individual holding the RF tag 7 is authorized personnel. In the present embodiment, the CPU 21 is configured to advance the process of one or more input operations related to the system controller 2.

Figure 4:
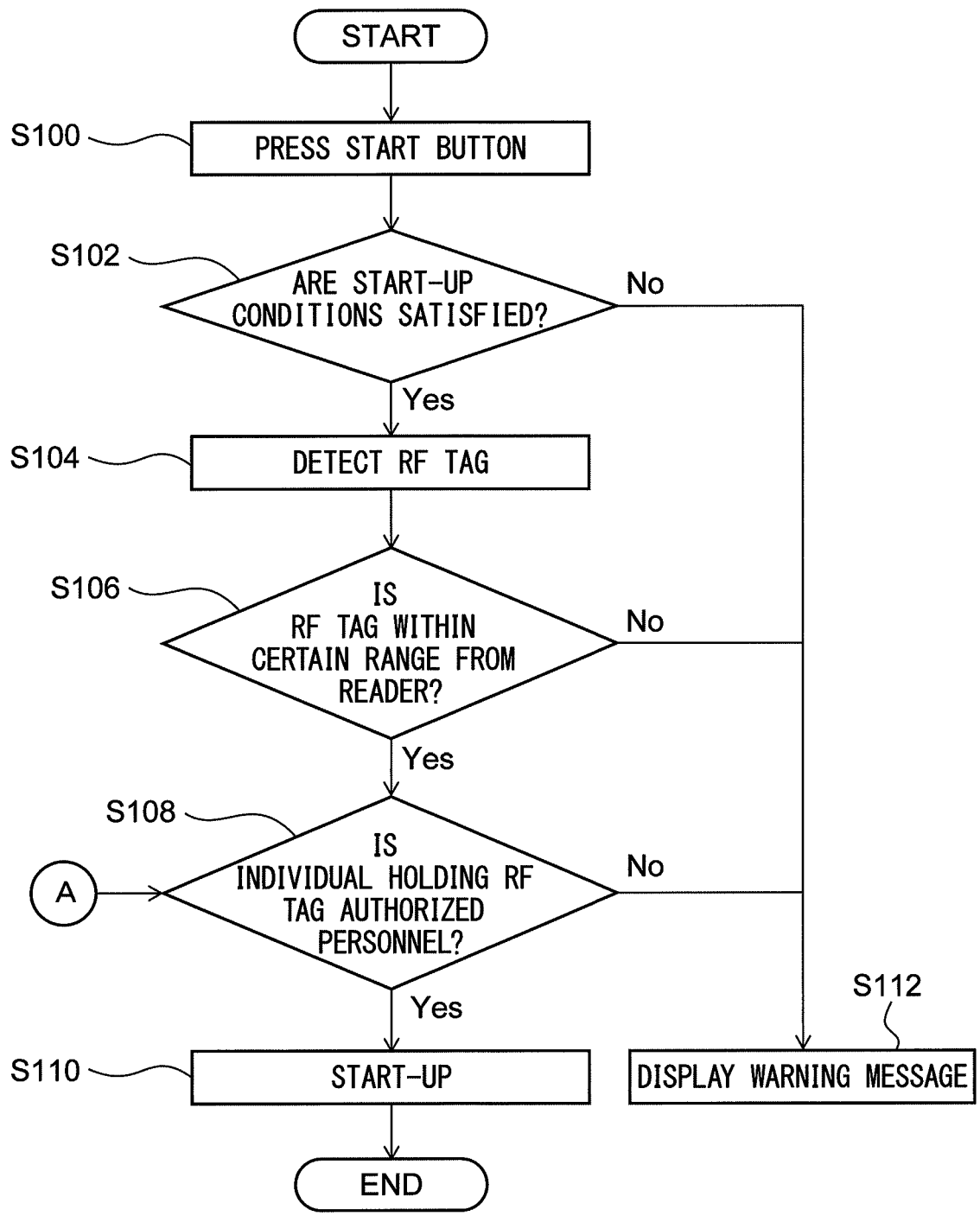
FIG. 4 is a flowchart showing the operations of the system controller of FIG. 3.

Then, the operations of the robot system 100 will be described. First, the start-up operation of the robot 1 in the system controller 2 will be described. FIG. 4 is a flowchart showing the operations of the system controller of FIG. 1.

As shown in FIG. 4, the operations of the system controller 2 begin from the time when the start button 2 of the system controller 2 is pressed (step S100). Then, the CPU 21 determines whether or not one or more necessary start-up conditions are satisfied (step S102). For example, it is determined whether or not the robot 1 is at the start position, and whether or not preparations for operation of the robot 1 are completed. When it is determined in step S102 that the one or more necessary start-up conditions have been satisfied, the system controller 2 attempts to detect the RF tag 6 using the reader 7 (step S104).

Then, the CPU 21 determines whether or not the RF tag 6 is within a certain range from the reader 7 (step S106). When it is determined in step S106 that the RF tag 6 is within the certain range from the reader 7, the CPU 21 determines whether or not the biometric authentication result from the RF tag 6 indicates that the individual holding the RF tag 6 is authorized personnel (step S108). Input A indicates the input of the biometric authentication result from the RF tag 6 to the reader 7. When the biometric authentication result in step S108 indicates that the individual holding the RF tag 6 is authorized personnel, the CPU 21 advances the process of activating the system controller 2 (step S110) and ends the series of operations. The CPU 21, specifically, issues commands or the like to operate the robot 1.

If it is determined in step S102 that the one or more necessary start-up conditions are not satisfied, if it is determined in step S106 that the RF tag is not within the certain range of the reader 7, or if it is determined in step S108 that the biometric authentication result does not indicate that the individual holding the RF tag 7 is authorized personnel, the system controller 2 displays a warning message on the touch panel 22 (step S112). The warning may be indicated by, for example, a sound or may be indicated by the signal lamp 23.

In the foregoing description, the start-up operation of the robot 1 in the system controller 2 has been described as an example of the operation related to the task of the robot 1 requiring biometric authentication. However, other input operations related to the system controller 2 may be included as operations requiring biometric authentication.

Figure 5:
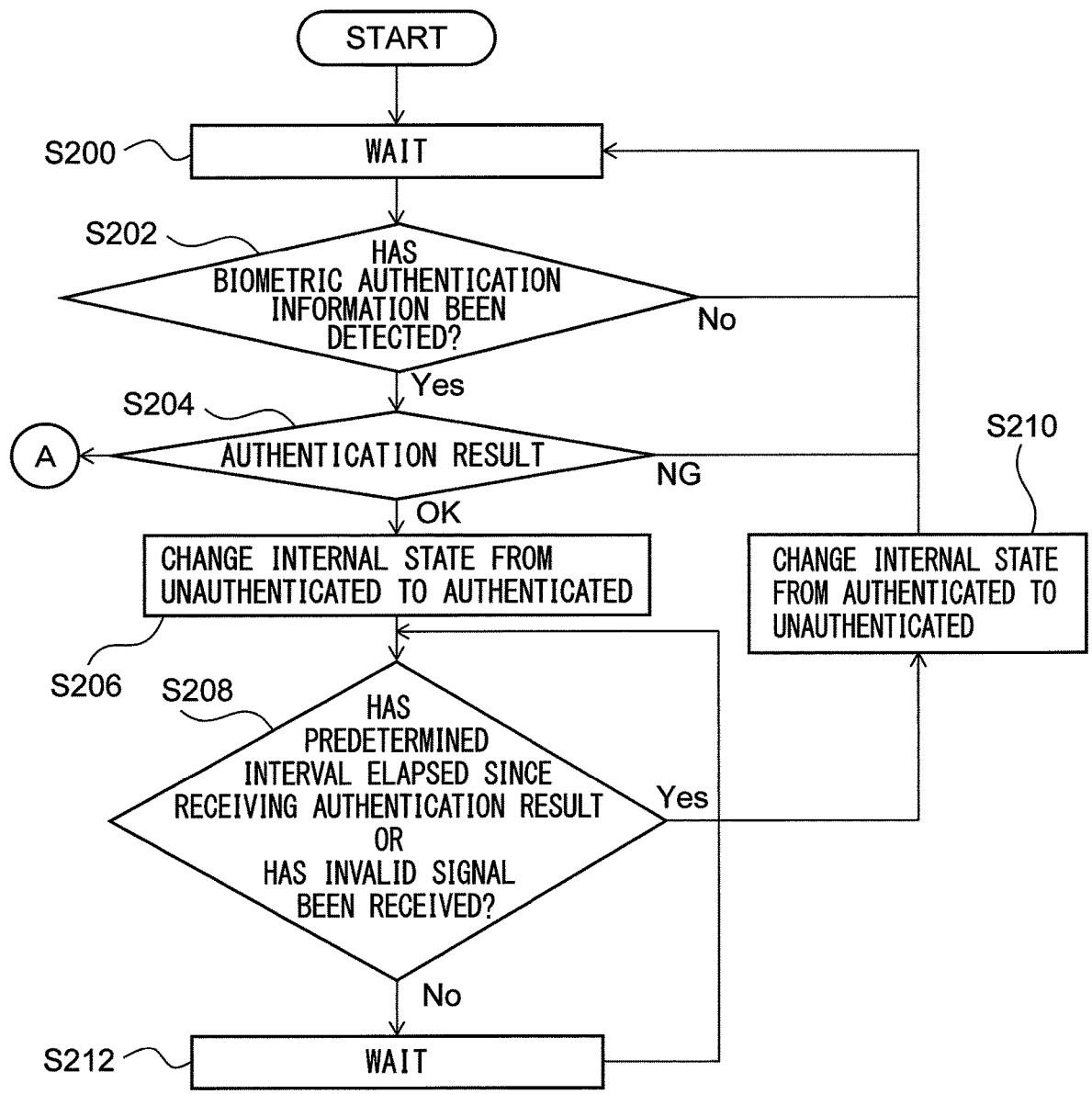
FIG. 5 is a flowchart showing the operations of the RF tag of FIG. 3.

Then, the biometric authentication operation of the RF tag 6 will be described. FIG. 5 is a flowchart showing the operations of the RF tag of FIG. 1.

As shown in FIG. 5, the operations of the RF tag 6 begin with waiting (step S200). Then, the RF tag 6 determines whether or not the biometric authentication information of the operator O has been detected by the detection device 61 (step S202). When the biometric authentication information has been detected in step S202, the CPU 63 determines whether or not the individual holding the RF tag 6 is authorized personnel by comparing the biometric authentication information detected by the detection device 61 with the unique biometric authentication information on authorized personnel stored in the memory 62, and as a result, obtains the biometric authentication result (step S204). The biometric authentication result obtained by the CPU 63 is transmitted from the first antenna 64 as output A. Output A is received by the reader 7 (refer to input A in FIG. 4).

Referring again to FIG. 5, when the biometric authentication result obtained in step S204 indicates that the individual holding the RF tag 6 is authorized personnel, the CPU 63 changes the internal state from Unauthenticated to authenticated (step S206).

If biometric authentication information is not detected in step S202 or if the biometric authentication result obtained in step S204 indicates that the individual holding the RF tag 6 is not authorized personnel, the process for the RF tag 6 returns to step S200 and waits for a certain interval again. The waiting interval of step S200 is, for example, 30 seconds.

After step S206, the CPU 63 determines whether or not a predetermined interval has elapsed after obtaining the biometric authentication result and whether or not an invalid signal has been received from the control device 10 (step S208). The predetermined interval is, for example, between 30 minutes and one hour, but the predetermined interval may be 30 minutes or less or one hour or more. The invalid signal is transmitted from the control device 10, and may be transmitted from, for example, the second antenna 71 of the reader 7, or may be transmitted from some other constituent element. The invalid signal may be transmitted from the reader 7 after, for example, the operator O performs a specific operation in the system controller 2 (e.g., after the operator O has performed the start-up operation of the robot 1 in the system controller 2). The invalid signal may be transmitted in other situations as well.

In step S208, when the CPU 63 determines that at least one of the predetermined interval has elapsed after obtaining the biometric authentication result and the invalid signal was received from the control device 10, the CPU 63 changes the internal state from authenticated to unauthenticated (i.e., the CPU 63 invalidates the biometric authentication result) (step S210). Then, the process for the RF tag 6 returns to step S200 and again waits for the certain interval.

When it is determined in step S208 that the predetermined interval has not elapsed since the CPU obtained the biometric authentication result and an invalid signal has not been received from the control device 10, the process for the RF tag 6 waits for a certain interval (step S212), and then returns again to step S208. The certain interval in step S212 is, for example, 60 seconds.

In the above description, in step S208 the CPU 63 determines both whether or not a predetermined interval has elapsed after obtaining the biometric authentication result and whether or not an invalid signal has been received from the control device 10. However, the CPU 63 may determine only one of whether or not a predetermined interval has elapsed after obtaining the biometric authentication result and whether or not an invalid signal has been received from the control device 10.

In the robot system 100 according to the first embodiment as described above, the RF tag 6 can determine, using biometric authentication, whether or not the individual holding the RF tag 6 is authorized personnel. When the biometric authentication result indicates that the individual holding the RF tag 6 is authorized personnel, the process of the operation related to the task of the robot 1 is advanced. Thus, it is possible to prevent the process of the operation related to the task of the robot 1 from advancing even if an unauthorized person holds the RF tag 6. Therefore, security can be improved. Furthermore, since operations performed by unauthorized personnel can be prevented, incorrect operations and accidents can be prevented.

Furthermore, since biometric authentication is performed by the RF tag 6, if a plurality of robot systems are present, by providing a reader 7 in each robot system, a biometric authentication function is not required for each robot system. Therefore, it is possible to access a plurality of robot systems using a single RF tag 6. Furthermore, if a plurality of robot systems are present, since it is not necessary to provide a biometric authentication function in each robot system, security can be improved at a low cost.

Furthermore, in the robot system 100, the control device 10 includes a reader 7 having the second antenna 71, and a CPU 21 capable of communicating with the reader 7 and advancing the process of the operation related to the task of the robot. More specifically, the control device 10 includes a system controller 2 which controls a task execution machine including the robot 1, and the operation related to the task of the robot 1 which requires biometric authentication includes input operations to the system controller 2. Thus, even if an unauthorized person holds the RF tag 6, advancement of the process of the input operation of the system controller 2 can be prevented. Therefore, security can be improved. Furthermore, when the reader 7 is mounted in a location visible to the operator O on the system controller 2, the operator O can easily recognize that the operation of the system controller 2 requires biometric authentication.

Furthermore, in the robot system 100, the CPU 63 invalidates the biometric authentication result when a predetermined interval has elapsed since the biometric authentication result has been obtained. Thus, for example, if an authorized person drops the RF tag 6, and an unauthorized person obtains the RF tag 6, after a predetermined interval elapses, the biometric authentication result is invalidated, and operations performed by an unauthorized person can be prevented.

Furthermore, in the robot system 100, when the CPU 63 receives an invalid signal from the control device 10, the biometric authentication result is invalidated. Thus, for example, biometric authentication is required each time the operator O performs a specific operation (e.g., the start-up operation) for the control device 10. Therefore, security can be further improved.

Figure 6:
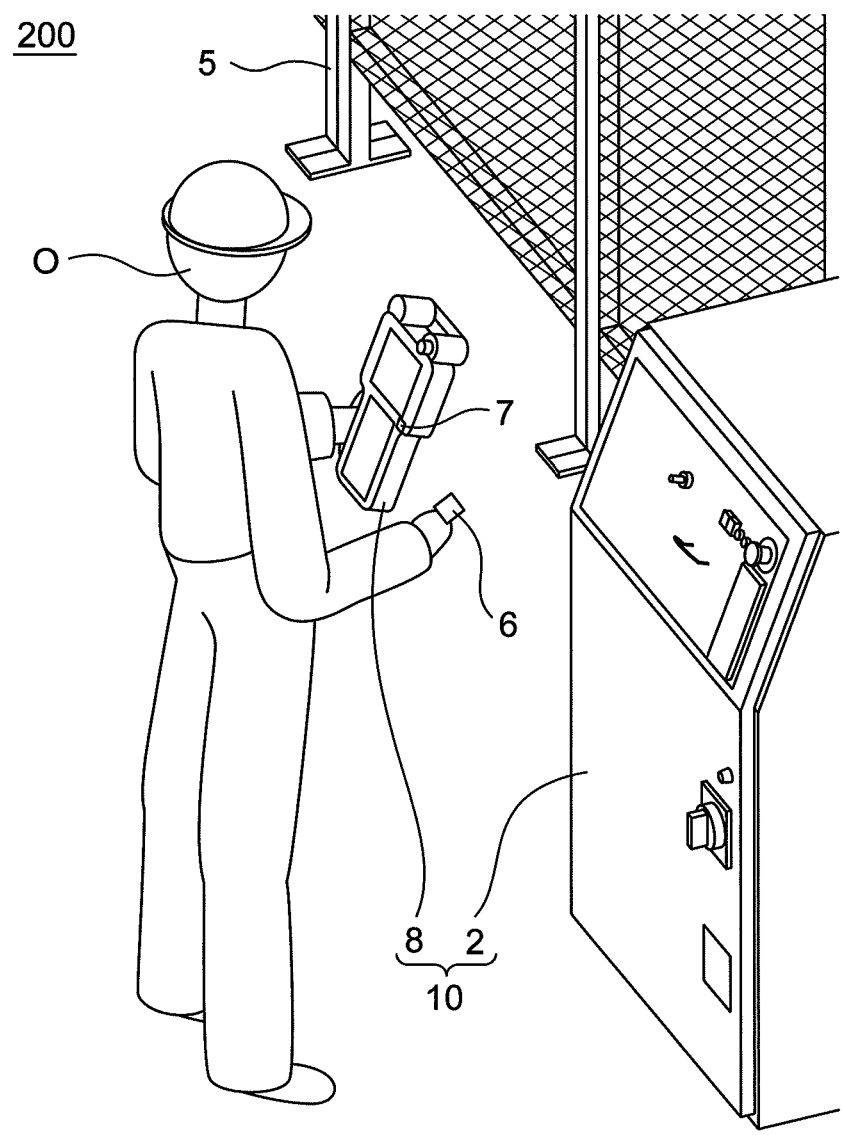
FIG. 6 is an enlarged partial perspective view of a robot system according to a second embodiment.
Figure 7:
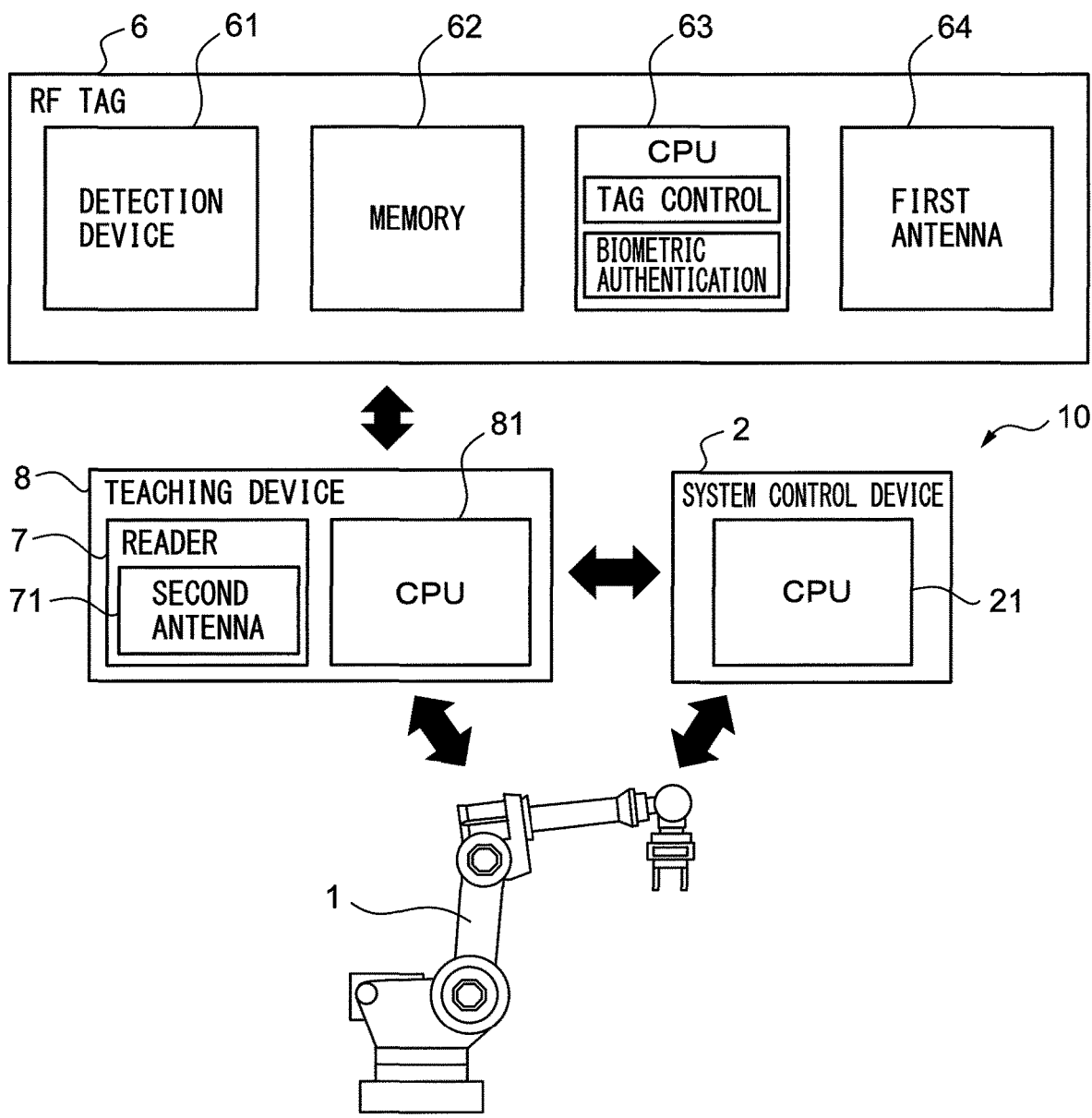
FIG. 7 is a block diagram of the robot system of FIG. 6.

Then, a robot system according to a second embodiment will be described. FIG. 6 is an enlarged partial perspective view showing the robot system according to the second embodiment, and FIG. 7 is a block diagram of the robot system of FIG. 6. As shown in FIG. 6, the robot system 200 according to the second embodiment differs from the first embodiment in that the control device 10 includes a teaching device 8, and the robot system 200 according to the second embodiment the reader 7 is incorporated in the teaching device 8. The operator O can, for example, move the robot 1 using the teaching device 8, and can store desired operations in the memory provided in the system controller 2 or the teaching device 8.

As shown in FIG. 7, the reader 7 incorporated in the teaching device 8 is configured to communicate with the first antenna 64 of the RF tag 6 using the second antenna 71. The teaching device 8 includes a CPU 81. In the present embodiment, the CPU 81 functions as the second processor. The CPU 81 is configured to control each component of the teaching device 8. The CPU 81 is configured to advance the input operation of the teaching device 8 when the biometric authentication result indicates that the individual holding the RF tag 6 is authorized personnel. The CPU 81 is configured to communicate with the reader 7. The teaching device 8 is configured to be capable of wireless communication or wired communication with the robot 1 and the system controller 2.

The operations of the teaching device 8 in the robot system 200 according to the second embodiment as above are substantially the same as the operations of the system controller 2 in the robot system 100 according to the first embodiment shown in FIG. 4. The operations of steps S100 to S112 are performed by the teaching device 8.

The operations of the teaching device 8 begin when the start button of the teaching device 8 is pressed (step S100). Then, the CPU 81 determines whether or not one or more necessary start-up conditions are satisfied (step S102). The start-up conditions to be determined include, for example, whether or not the robot 1 is ready for operations. When it is determined in step S102 that the one or more necessary start-up conditions have been satisfied, the teaching device 8 attempts to detect the RF tag 6 using the reader 7 (step S104).

Then, the CPU 81 determines whether or not the RF tag 6 is within a certain range from the reader 7 (step S106). When it is determined in step S106 that the RF tag 6 is within the certain range from the reader 7, the CPU 81 determines whether or not the biometric authentication result from the RF tag 6 indicates that the individual holding the RF tag 6 is authorized personnel (step S108). When the biometric authentication result in step S108 indicates that the individual holding the RF tag 6 is authorized personnel, the CPU 81 advances the process of activating the teaching device 8 (step S110) and ends the series of operations.

When it is determined in step S102 that the one or more necessary start-up conditions are not satisfied, when it is determined in step S106 that the RF tag is not within the certain range of the reader 7, or when it is determined in step S108 that the biometric authentication result does not indicate that the individual holding the RF tag 7 is authorized personnel, the teaching device 8 displays a warning message on a display device (step S112). The warning may be indicated by, for example, a sound.

In the above description, the start-up operation of the robot 1 in the teaching device 8 has been described as the operation related to the task of the robot 1 requiring biometric authentication. However, other input operations related to the teaching device 8 may be included in the operations which require biometric authentication. Such operations may include, for example, teaching tasks and the like.

The operations of the RF tag 6 in the robot system 200 according to the second embodiment are the same as the operations of the RF tag 6 in the robot system 100 according to the first embodiment shown in FIG. 5. Thus, an explanation thereof has been omitted.

The robot system 200 according to the second embodiment as described above has substantially the same effects as the robot system 100 according to the above-described first embodiment.

Further, in the robot system 200, the control device 10 includes a teaching device 8 for controlling the robot 1, and operations related to the task of the robot 1 which require biometric authentication include input operations to the teaching device 8. Thus, even if an unauthorized person holds the RF tag 6, it is possible to prevent operations of the teaching device 8 from being performed. Thus, security can be improved. Furthermore, when the reader 7 is mounted in a location visible to the operator O in the teaching device 8, the operator O can easily recognize that biometric authentication is required for the operations of the teaching device 8.

Then, a robot system according to the third embodiment will be described. The robot system according to the third embodiment has the same configuration as the robot system 100 according to the first embodiment shown in FIG. 3. The robot system according to the third embodiment differs from the robot system 100 according to the first embodiment in that, in the robot system according to the third embodiment, the memory 62 of the RF tag 6 is configured to store the history of operations performed by authorized personnel, and in this embodiment, the history of operations of the system controller 2.

Figure 8:
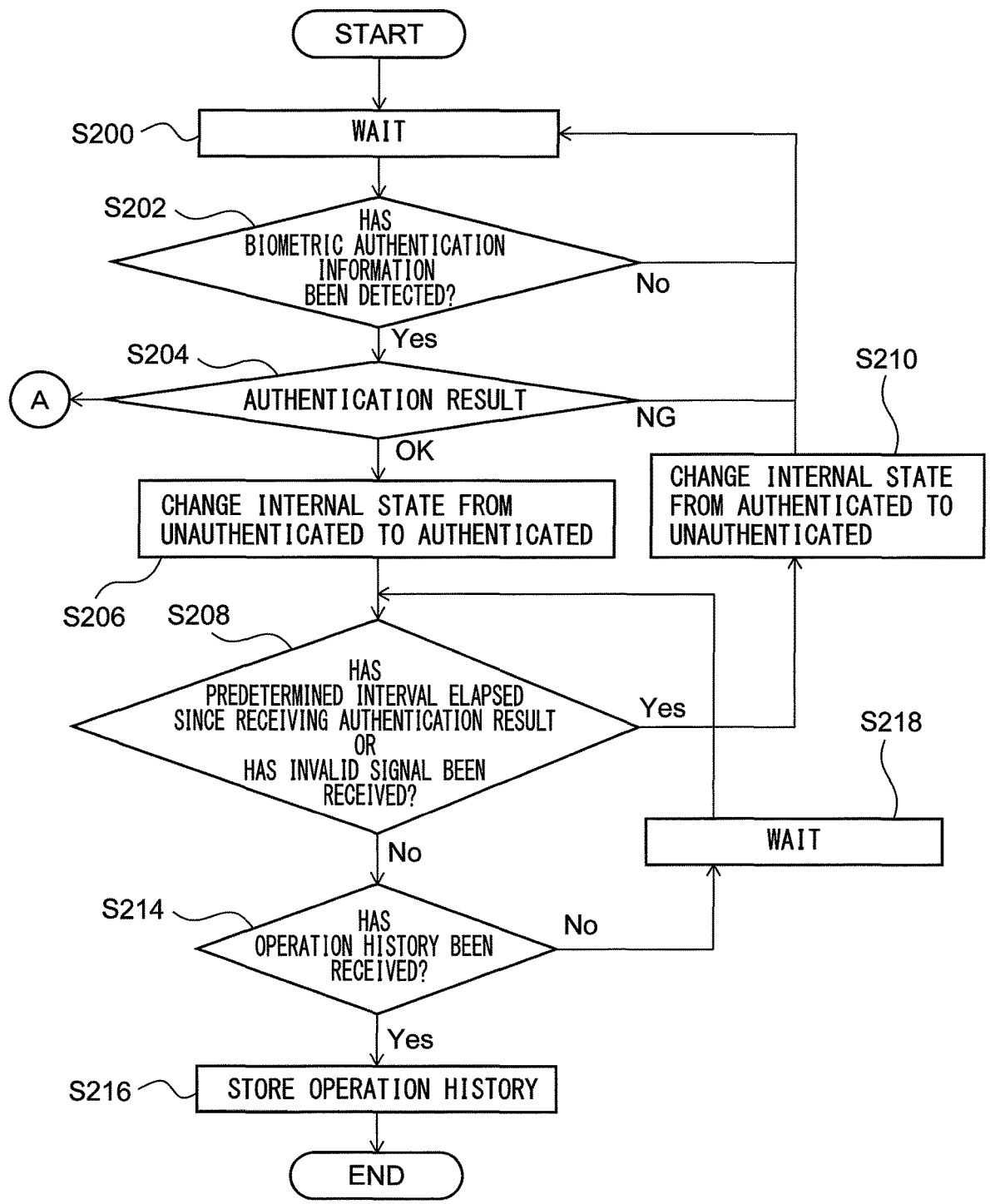
FIG. 8 is a flowchart showing the operations of the RF tag of a robot system according to a third embodiment.

FIG. 8 is a flowchart showing the operations of the RF tag of the robot system according to the third embodiment. Step S200 to step S208 are the same as step S200 to step S208 of the RF tag 6 in the robot system 100 according to the first embodiment shown in FIG. 5. Thus, an explanation thereof has been omitted.

When the CPU 63 determines in step S208 that a predetermined interval has not elapsed after the biometric authentication result has been obtained and an invalid signal has not been received from the control device 10, the CPU 63 determines whether or not the operation history has been received from the reader 7 (step S214). The operation history includes, for example, one or a plurality of operations performed by authorized personnel during the period from the start to the finish of the system controller 2. Each operation may be associated with the name or identification number of the authorized personnel that performed the operation. Furthermore, the operation history may include the time at which each operation was performed, and each operation and each time may be associated with each other.

When it is determined in step S214 that the RF tag 6 has received the operation history from the reader 7, the RF tag 6 stores the received operation history in the memory 62 (step S216), and the series of operations end.

When it is determined in step S214 that the RF tag 6 has not received the operation history from the reader 7, the process for the RF tag 6 waits for a certain interval (step S218) and then returns to step S208. The predetermined interval in step S218 is, for example, 60 seconds.

In the above description, the RF tag 6 is incorporated in the system controller 2, and the memory 62 of the RF tag 6 is configured to store the operation history of the system controller 2 performed by authorized personnel. Alternatively, the RF tag 6 may be incorporated in the teaching device 8, and the memory 62 of the RF tag 6 may be configured to store the operation history of the teaching device 8 performed by authorized personnel.

The operation history stored in the memory 62 of the RF tag 6 may be, for example, collected in a separate management device. The management device may be configured to collect, for example, the operation histories of a plurality of authorized personnel from a plurality of RF tags 6.

The robot system according to the third embodiment as described above has substantially the same effects as the robot system 100 according to the above-described first embodiment.

Further, in the robot system according to the third embodiment, the memory 62 of the RF tag 6 is configured to store the history of operations performed by authorized personnel. Thus, it is possible to confirm in the future who performed the operations of the robot 1. Therefore, the robot system can be more appropriately managed.

Robot systems according to the embodiments have been described, but the present invention is not limited to the above-described embodiments. A person skilled in the art would understand that various modifications to the embodiments described above can be made. Furthermore, a person skilled in the art would appreciate that features included in one embodiment may be incorporated in other embodiments or interchanged with those in other embodiments, as long as there are no inconsistencies therebetween.

For example, in the above-described embodiments, the reader 7 is incorporated in the system controller 2 or the teaching device 8. However, readers 7 may be incorporated in both the system controller 2 and the teaching device 8. Furthermore, when the control device 10 includes other components the operations of which are related to the tasks of the robot 1 which are performed by authorized personnel, the reader 7 may be incorporated in the other components other than the system controller 2 and the teaching device 8.

The invention claimed is:

1. A system, comprising:
a plurality of robots;
a plurality of control devices for controlling the respective robots; and a single RF tag; the single RF tag comprising:
- a detection device for detecting biometric authentication information of an individual;
- a memory for storing unique biometric authentication information of an authorized person which is authorized to perform operations related to tasks of the respective robots;
- a first processor for obtaining a biometric authentication result by comparing the biometric authentication information detected by the detection device with the unique biometric authentication information stored in the memory; and
- a first antenna for transmitting the biometric authentication result obtained by the first processor; wherein each of the plurality of control devices comprises a second antenna for receiving the biometric authentication result transmitted from the single RF tag, a reader comprising the second antenna, and a second processor which can communicate with the reader and which advances the process of the operation, and each of the control devices advances a process of the operation performed by the individual in connection with the operation of the respective robot without the detection of the biometric authentication information by the respective plurality of control devices when the biometric authentication result indicates that the individual is the authorized person.

2. The system according to claim 1, wherein the control devices comprise system controllers for controlling a task execution machine including the robots, and
the operation includes an input operation to the system controllers.

3. The system according to claim 1, wherein the control devices comprise teaching devices which control the robots, and
the operation includes an input operation to the teaching devices.

4. The system according to claim 1, wherein the control devices store a history of the operation.

5. The system according to claim 1, wherein the first processor invalidates the biometric authentication result when a predetermined time has elapsed since obtaining the biometric authentication result.

6. The system according to claim 1, wherein the first processor invalidates the biometric authentication result when an invalid signal is received from one of the control devices.

7. The system according to claim 1, wherein the biometric authentication indication comprises an indication of whether the biometric authentication information detected by the detection device matches the unique biometric authentication information of the authorized person.

* * * * *